United States Patent
Haering et al.

(10) Patent No.: US 12,080,897 B2
(45) Date of Patent: Sep. 3, 2024

(54) HOLDER FOR AN ELECTRODE OF A BUTTON BATTERY AND A BATTERY PROVIDED THEREWITH

(71) Applicant: Renata AG, Itingen (CH)

(72) Inventors: Pascal Haering, Muttenz (CH); Han Wu, Pembroke Pines, FL (US); Remo Frey, Titterten (CH)

(73) Assignee: Renata AG, Itingen (CH)

( * ) Notice: Subject to any disclaimer, the term of this patent is extended or adjusted under 35 U.S.C. 154(b) by 70 days.

(21) Appl. No.: 17/480,553

(22) Filed: Sep. 21, 2021

(65) Prior Publication Data

US 2022/0190412 A1 Jun. 16, 2022

(30) Foreign Application Priority Data

Dec. 15, 2020 (EP) .................. 20214346

(51) Int. Cl.
- *H01M 50/109* (2021.01)
- *H01M 10/04* (2006.01)
- *H01M 10/0525* (2010.01)

(52) U.S. Cl.
CPC ..... *H01M 50/109* (2021.01); *H01M 10/0427* (2013.01); *H01M 10/0525* (2013.01)

(58) Field of Classification Search
None
See application file for complete search history.

(56) References Cited

U.S. PATENT DOCUMENTS

2014/0308554 A1* 10/2014 Khakhalev .......... H01M 4/0471
  361/503
2015/0147631 A1  5/2015 Tsuda et al.

FOREIGN PATENT DOCUMENTS

| CN | 201717321 U |   | 1/2011 |
|----|-------------|---|--------|
| CN | 201773903 U | * | 3/2011 |
| CN | 102683639 A |   | 9/2012 |
| CN | 102780008 A | * | 11/2012 |
| CN | 203553277 U | * | 4/2014 |

(Continued)

OTHER PUBLICATIONS

Diao et al. (CN203553277U and Machine Translation as English version) (Year: 2014).*

(Continued)

*Primary Examiner* — Milton I Cano
*Assistant Examiner* — Joshua P Mcclure
(74) *Attorney, Agent, or Firm* — Oblon, McClelland, Maier & Neustadt, L.L.P.

(57) ABSTRACT

An electrically conductive holder is provided that is suitable for receiving a tablet electrode of a button battery. The holder includes a bottom portion to be fitted coaxially within terminal of a button battery. The holder further includes an upstanding wall portion. The bottom portion is flat and provided with a plurality of apertures through the complete thickness of the bottom portion. At least one group of apertures is distributed at regular angular intervals around the center of the bottom portion, spanning 360°. The strips of solid material of the bottom portion between two adjacent apertures are preferable narrow compared to the dimensions of the adjacent apertures so as to provide a mechanical support for the tablet electrode while also being able to deform under the influence of a volumetric expansion of the electrode.

6 Claims, 4 Drawing Sheets

(56) References Cited

FOREIGN PATENT DOCUMENTS

| CN | 103828090 A   |   | 5/2014  |
|----|---------------|---|---------|
| CN | 104037447 A   |   | 9/2014  |
| CN | 204966589 U   |   | 1/2016  |
| CN | 108140748 A   |   | 6/2018  |
| CN | 108832037 A   |   | 11/2018 |
| CN | 209344226 U   |   | 9/2019  |
| CN | 112038675 A   |   | 12/2020 |
| EP | 2 863 459 A1  |   | 4/2015  |
| JP | 2004342422 A  | * | 12/2004 |
| WO | 2019/13769 A1 |   | 12/2019 |

OTHER PUBLICATIONS

Chen et al. (CN201773903U and Machine Translation as English version) (Year: 2011).*
Huang et al. (CN102780008A and Machine Translation as English version) (Year: 2012).*
Sakata et al. (JP2004342422A and Machine Translation as English version) (Year: 2004).*
Jian et al. (WO2019237649(A1) as cited in IDS and using Machine Translation as English version) (Year: 2019).*
Yu et al. (CN204966589(U) as cited in IDS and using Machine Translation as English version) (Year: 2016).*
European Search Report issued May 7, 2021 in European Application 20214346.7, filed on Dec. 15, 2020, 2 pages.
Chinese Office Action issued in Chinese Patent Application No. 202111533464.5 on Sep. 14, 2023.

\* cited by examiner

HOLDER FOR AN ELECTRODE OF A BUTTON BATTERY AND A BATTERY PROVIDED THEREWITH

CROSS-REFERENCE TO RELATED APPLICATION

This application claims priority to European Patent Application No. 20214346.7 filed on Dec. 15, 2020, the entire disclosure of which is hereby incorporated herein by reference.

FIELD OF THE INVENTION

The present invention is related to button-shaped batteries, in particular to a support means for the cathode of such a battery.

STATE OF THE ART

Button-shaped batteries, also referred to shortly as 'button batteries' or 'button cells' are well known. Various types of button batteries are in use, distinguished by various dimensions and by the materials used for the electrodes and the electrolyte. A commonly used type for low voltage appliances such as wristwatches or the like is often referred to as a 'CR' type battery, the C referring to the chemistry of the electrodes and the R to the round shape of the battery. CR batteries comprise a lithium-based anode and a cathode comprising manganese dioxide as active material. The electrolyte may be a solid or liquid organic material. Other material combinations are known under various other letter codes, such as BR, SR, etc.

The cathode of a CR battery is usually in the form of a tablet produced by compacting a powder mixture comprising the active material, a binder, carbon and/or graphite to reduce the internal resistance, and other additives. According to one well-known technique, the mixture is pressed into the shape of a tablet with a mesh at the bottom. The mesh is added to increase the strength of the tablet and to provide a better electrical contact between the tablet and the metal can which lies under the tablet and which forms the positive terminal of the battery.

During discharge, the tablet expands because of the ingress of lithium ions migrating from the anode. As the amount of lithium ions increases in the tablet, the tablet expands in all directions. Problems resulting from this expansion include:

Losing contact with the mesh: the mesh is pressed onto the tablet without any binding agent. As the tablet expands, the grip on the mesh by the powders becomes looser, and finally the two become separated.

While the tablet expands during discharge, the anode, made of metallic lithium, is consumed. In an ideal situation, the expansion rate of the cathode tablet in the height direction is greater than the rate at which the lithium anode recedes, so that a conductive path between the two electrodes is maintained. However, as there is no restriction in the direction of the tablet's expansion, the tablet not only grows in the height direction, but also in the radial direction. This causes the rate of expansion toward the lithium anode to slow down, eventually leading to a loss of a conductive path between the electrodes.

A known solution to these problems is to apply a metal ring instead of a mesh, with the tablet pressed inside the ring. During discharge, the ring forms a wall that directs the expansion of the tablet in the height direction only, towards the anode, thus maintaining the conductive path between the anode and the cathode. However, as the ring supports the tablet only along its circumference, the tablet is now more likely to expand towards the positive can during discharge, in the direction away from the anode. This expansion pushes itself against the can, lifts the ring away from the can, resulting in the loss of electrical contact between the cathode and the can.

Other ring designs have been proposed to alleviate these particular problems, including a ring not having an open bottom but provided with a grid on the bottom of the ring, as disclosed for example in patent publication documents CN103606684 and CN203553277. In these latter examples, the grid exhibits a staggered pattern, consisting of parallel strips which are bent repeatedly inward and outward relative to the bottom plane of the ring. The inwardly bent portions of the strips may imbed themselves into the powder during tablet pressing, increasing the strength of the tablet. The outwardly bent portions of the strips are in direct contact with the can and exhibit a degree of elasticity, which enables maintaining a good contact between the tablet and the can. Nevertheless, expansion of the tablet during discharge is still likely to cause problems. Also, when a tablet is pressed into a ring of this type during the manufacturing process, the force required to press the powders together is applied directly on the inwardly and outwardly bent portions. Unless the ring is made from metals with very high strength, these portions may be flattened, thereby reducing or eliminating the intended beneficial effect of the staggered patterns. Another problem is that when the material of the tablet is applied in powder form and pressed into the ring, the staggered patterns may cause imperfect filling of the powder mixture, leading to voids in the tablet. Also, the staggered strips represent 3D shapes which require a complex stamping process for manufacturing the rings, which may increase the cost of the manufacturing process.

SUMMARY OF THE INVENTION

The invention aims to provide a solution to the above-described problems. This aim is achieved by an electrode holder and by a battery in accordance with the appended claims.

According to the invention, an electrically conductive holder is provided that is suitable for receiving a tablet electrode of a button battery pressed into the holder. The holder comprises a bottom portion that is preferably circular in shape so as to be able to be fitted coaxially within the can-shaped terminal of a button battery. The holder further comprises an upstanding wall portion, the wall portion performing the same function as the ring-type holding means of the prior art. The bottom portion is flat and provided with a plurality of apertures through the complete thickness of the bottom portion. According to preferred embodiments, at least one group of apertures is distributed at regular angular intervals around the centre of the bottom portion, spanning 360°. The strips of solid material of the bottom portion between two adjacent apertures are preferable narrow compared to the dimensions of the adjacent apertures so as to provide a mechanical support for the tablet electrode while also being able to deform under the influence of a volumetric expansion of the electrode. The invention is equally related to a button battery provided with a holder according to the invention, and to an assembly comprising a holder according to the invention and an electrode table pressed therein.

The holder according to the invention is easy to manufacture and enables compacting of the electrode tablet without creating voids. The deformation of the narrow strips improves the contact between the holder and the can-shaped terminal of the battery. The apertures ensure optimal absorption of a liquid electrolyte.

DETAILED DESCRIPTION OF EMBODIMENTS OF THE INVENTION

Figure 1:
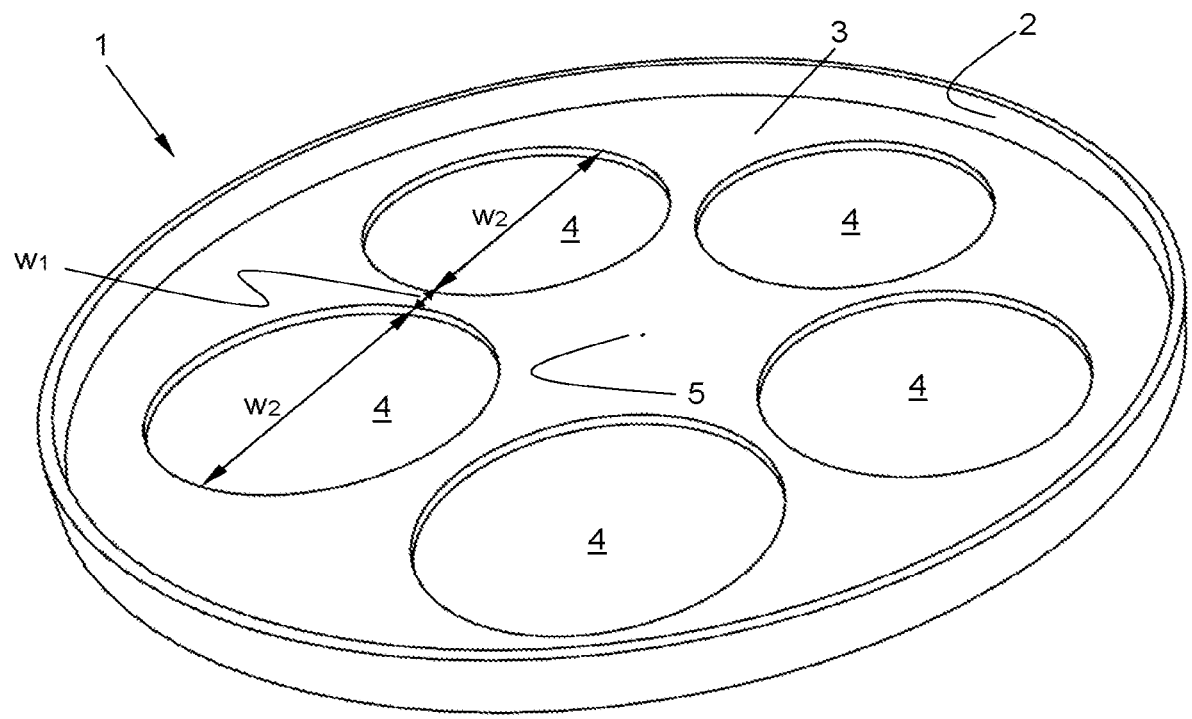
FIG. 1 illustrates a holder for a cathode tablet of a CR battery, in accordance with an embodiment of the invention.

FIG. 1 illustrates a holder 1 for a tablet-shaped cathode of a button battery in accordance with an embodiment of the present invention. The holder comprises a wall portion 2 and a bottom portion 3, the bottom portion being flat and circular in shape, and provided with 5 circular apertures 4 of equal diameter, distributed at regular angular intervals spanning 360° around the centre 5 of the bottom portion 3. Both the wall and bottom portions are formed of an electrically conductive material, preferably a metal that is mechanically, chemically, and electrochemically stable under the environment inside the battery, for example stainless steels such as 304, 316, aluminium, nickel, and most precious metals. The bottom portion 3 and the wall portion 2 form an integral piece which may for example be produced by a stamping technique known as such in the art. The wall portion 2 rises up from the edge of the bottom portion 3, and is preferably oriented perpendicularly with respect to the plane of the bottom portion 3. The wall portion 2 thus represents a ring configured to maintain the material of the cathode tablet in its interior. The diameter of the bottom portion 3 is of an order of magnitude consistent with the dimensions of standard CR-type batteries, for example between 1 and 2 cm. In the embodiment shown, the diameter of the apertures 4 is such that the areas of solid material in between adjacent apertures are narrow compared to the dimensions of the apertures. According to a preferred embodiment, and as illustrated in FIG. 1, each area in between two adjacent apertures 4 comprises at least one location or sub-area where the shortest distance between the two adjacent apertures is smaller than the width of the two apertures measured along the same direction as said shortest distance. In the embodiment of FIG. 1, the shortest distance between each pair of circular apertures 4 is a constant value, indicated as $w_1$ in the drawing. The above condition in this case is that $w_1$ is smaller than the distances $w_2$ measured along the same direction as $w_1$. Preferably, $w_1$ is significantly smaller than $w_2$, for example less than half, or less than ⅓, or less than ¼ of $w_2$. The advantage of this particular feature will be explained further in this text.

Figure 2A:
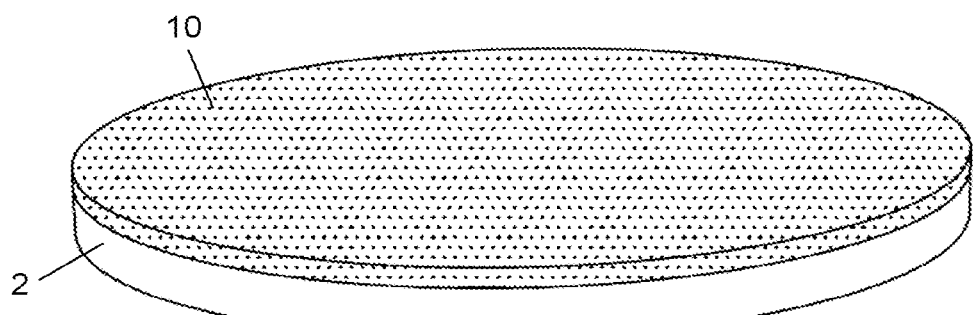
FIGS. 2a and 2b illustrate the holder of FIG. 1, with a cathode tablet inserted therein.
Figure 2B:
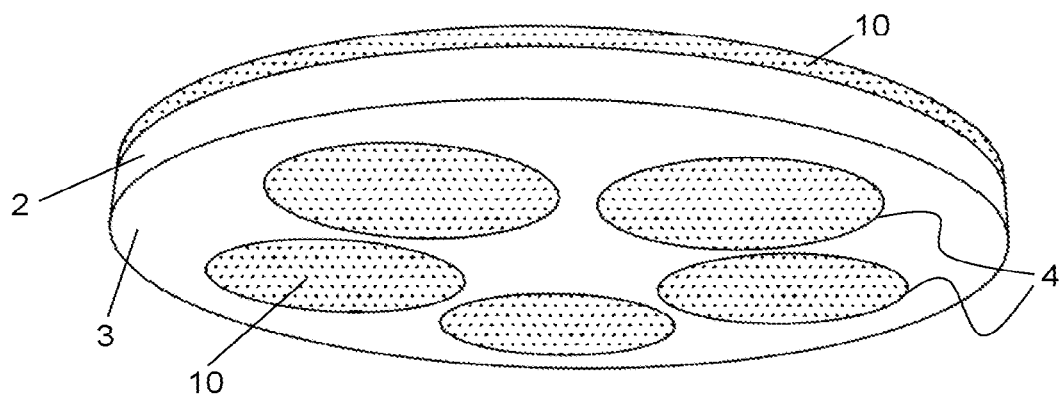

A cathode tablet is pressed into the holder, using a compacting technique for pressing a powder mixture containing active cathode material, a binder and other additives as described in the introduction. Compacting techniques known in the art for pressing a tablet into one of the above-described mesh or ring-type holding means may be applied. The result is illustrated in FIG. 2. In the embodiment shown, the compacted tablet 10 fills up the interior space of the wall portion 2 and is pressed into the apertures 4, so that tablet material is essentially level with the bottom surface of the holder 1. The tablet 10 may extend slightly above the upper rim of the wall portion 2, as illustrated.

Figure 3A:
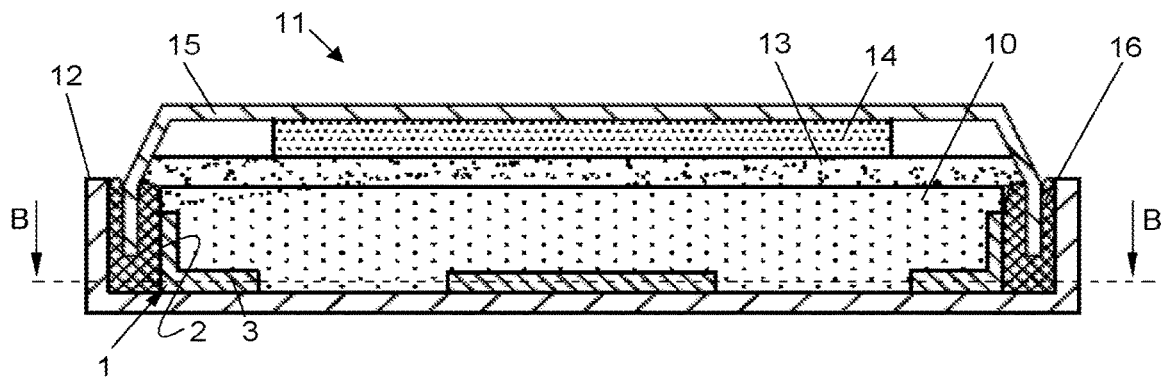
FIGS. 3a and 3b illustrate a CR battery, equipped with the holder and tablet of FIGS. 1 and 2.
Figure 3B:
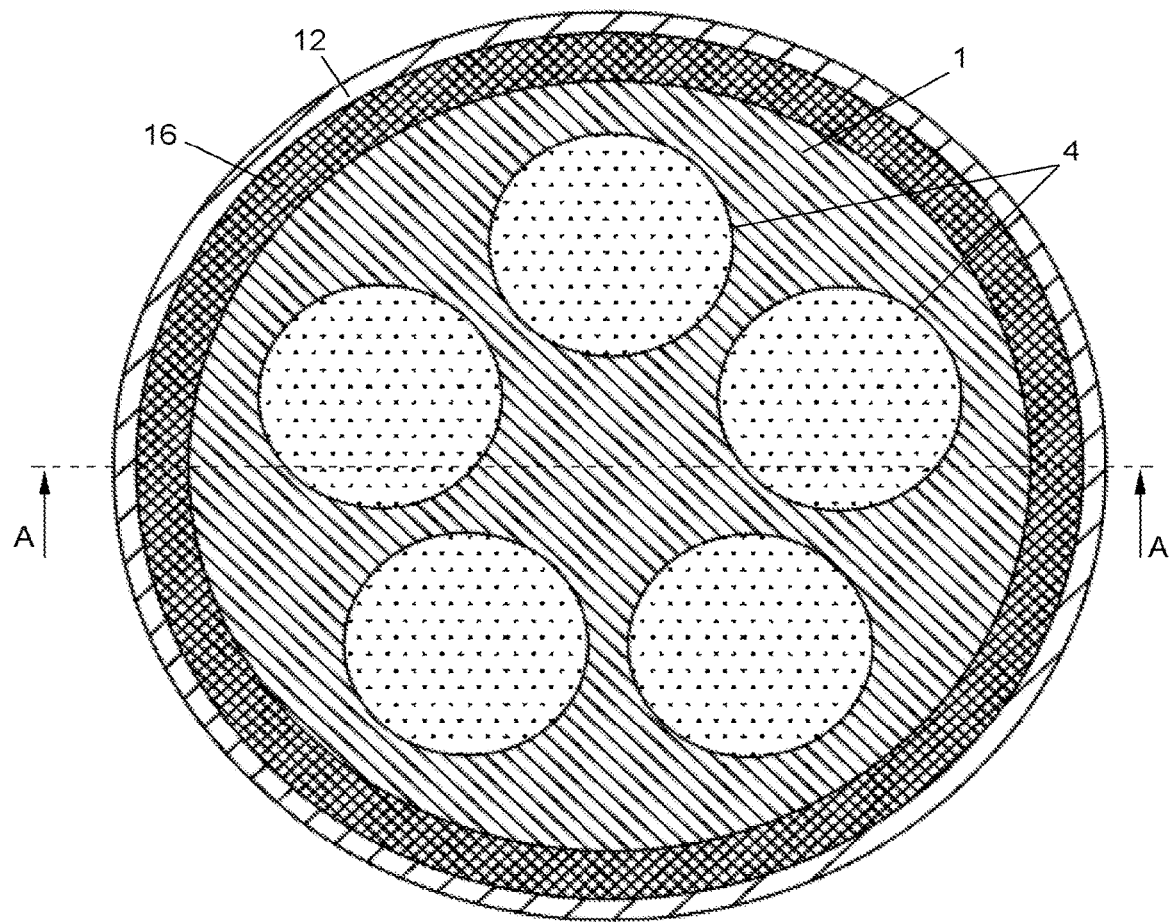

FIGS. 3a and 3b show a CR battery 11 equipped with the cathode holder 1 with the cathode tablet 10 pressed therein. The image represents the battery 11 at the start of its battery life, i.e. before any significant volume change of the electrodes has taken place. The holder 1 sits inside the can 12 that forms the positive terminal of the battery, with its bottom portion 3 contacting the bottom of the can 12. As described above, the compacted tablet material fills the apertures 4 and is therefore in physical contact with the bottom of the can 12. This is however not a requirement for the invention. Especially when smaller apertures 4 are applied, the tablet material may not entirely fill the apertures so that the tablet is not in direct contact with the can 12. In any case, it is primarily the electrically conductive material of the tablet holder 1 which ensures the electrical conduction between the tablet 10 and the can 12. Direct electrical conduction between the tablet material in the apertures 4 and the can 12 may take place, as is the case in the embodiment shown in the drawings, but it is not a requirement.

Above the tablet 10 is a separator sheet 13, that separates the cathode tablet 10 from a lithium anode 14 located on top of the separator sheet 13. The anode 14 is covered by a metal lid 15 that forms the negative terminal of the battery. An electrically insulating gasket 16 is inserted between the outer rims of the can 12 and the lid 15, effectively separating the positive and negative terminals and closing off the interior of the battery 11 from the external atmosphere.

The separator 13 may be a sheet of solid electrolyte laminated onto the tablet 10, in which case the tablet 10 also comprises the solid electrolyte mixed together with the active material. Alternatively, the battery may include a liquid electrolyte. In this case, the tablet 10 is soaked in this liquid electrolyte and the separator 13 may be a porous polymeric film that is itself electrically insulating, but that can absorb the liquid electrolyte in order to conduct lithium ions from the anode 14 to the cathode 10.

Details of the separator sheet 13, the can 12 and the lid 15, the gasket 16 and the materials used for the electrodes 10 and 14 may be in accordance with known battery types. The cathode holder 1 is however novel compared to known batteries and provides a number of non-obvious advantages, as described hereafter.

The holder 1 comprises no 3D patterns, such as the staggered patterns described in CN103606684 and CN203553277. This allows for an easier stamping technique to be used for manufacturing the holder, whereas a multi-step stamping method is required for the 3D patterns. The lack of 3D patterns also guarantees the consistency of the tablet shape and dimensions during the compacting step. Furthermore, the smooth bottom portion avoids tangling among different holders, making the holder easier to handle during manufacturing. The apertures 4 can be produced by a cutting technique known as such in the art.

Also, the flat surface of the bottom portion 3 provided with apertures 4 does not lead to imperfect filling of the holder 1 with the compacted powder mixture during tablet pressing. The tablet thereby fills the holder 1 consistently and without the appearance of voids.

As stated above, between adjacent apertures 4 of the bottom portion 3, this bottom portion 3 preferably comprises strips of conductive material, which are narrow compared to the dimensions of the apertures 4 themselves. According to preferred embodiments, this 'narrowness' is quantified by the distances $w_1$ and $w_2$ illustrated in FIG. 1, with $w_1 < w_2$, or $w_1 < \frac{1}{2} w_2$ or $w_1 < \frac{1}{3} w_2$ or $w_1 < \frac{1}{4} w_2$. On the one hand the narrow strips between the apertures 4 support the tablet and maintain its mechanical stability. On the other hand, as these strips are narrow compared to the other parts of the bottom portion, they are most likely to deform under the influence of the volumetric expansion of the tablet taking place during discharge. This deformation is advantageous because it causes the strips to bend towards the can 12, and to thereby be pushed against the can, ensuring that a good electrical contact is maintained. Taking into account the diameter and thickness of the tablet 10 and the applied materials, it is straightforward to design the dimensions and shape of the apertures 4 so that the above-described bending of the strips towards the can 12 takes place during discharge. The minimum value of w1 is determined by the strength and elasticity of the material of the holder. The material must be able to stretch and maintain contact with the cup during discharge without breaking.

When liquid electrolyte is used, the tablet 10 may be soaked in the electrolyte before being mounted in the can 12, followed by addition of excess liquid electrolyte. The apertures 4 in the bottom portion 3 of the holder 1 allow this excess electrolyte to be absorbed by the tablet 10 not only from the top but also from the bottom and the side (if the tablet extends above the wall portion as in FIGS. 1 to 3), ensuring optimal absorption of the electrolyte into the tablet.

Figure 4A:
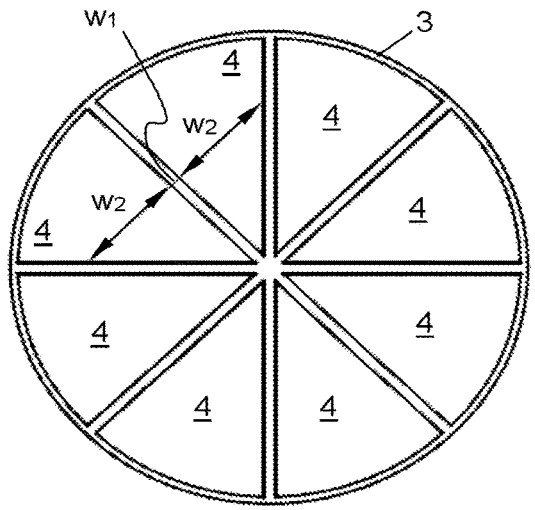
FIGS. 4a to 4d show alternative designs of a holder according to the invention.
Figure 4B:
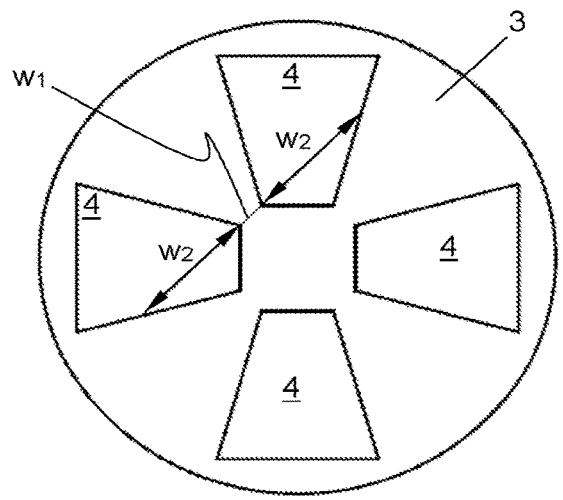
Figure 4C:
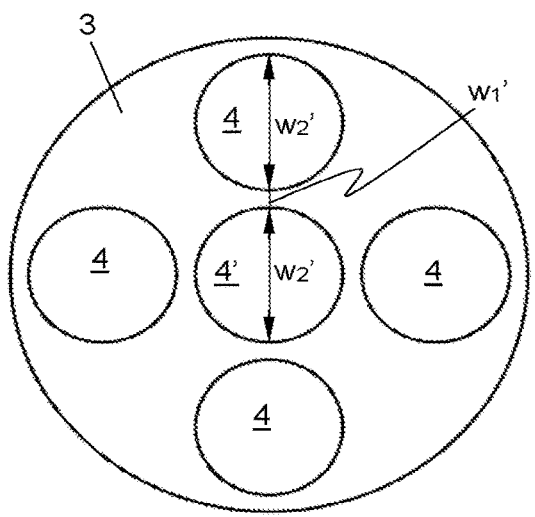
Figure 4D:
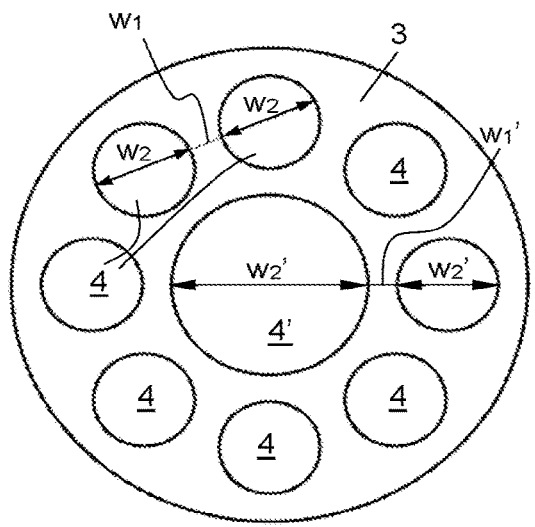

The invention is not limited to the embodiment shown in FIGS. 1 to 3. The shape of the apertures 4 may be different than circular, and the number of apertures may be anywhere between two and any realistic number applicable in view of the dimensions of the tablet FIGS. 4a to 4b illustrate alternative embodiments, showing each time a plane view of the bottom portion 3 of the holder. In FIG. 4a, the apertures 4 are pie-shaped, with narrow strips of constant width between each pair of adjacent apertures. It is clear that this embodiment answers to the characteristic that at least on one location, the shortest distance $w_1$ between two adjacent apertures is significantly smaller than the distances $w_2$ measured in the same direction. FIG. 4b illustrates an embodiment having trapezoid-shaped apertures 4. Distances $w_1$ and $w_2$ are again indicated, showing that the areas between adjacent apertures are narrow in at least one location. In FIGS. 4c and 4d, centrally placed apertures 4' are present, in addition to the angularly spaced apertures 4. The 'narrowness' of the strips of solid material between the central aperture 4' and one of the other apertures 4 is determined by the distance $w_1'$ compared to the diameter $w_2'$ of the surrounding apertures 4 and 4'.

The invention is also not limited to CR batteries but may be applied to any type of button-shaped battery known in the art.

Figure 5A:
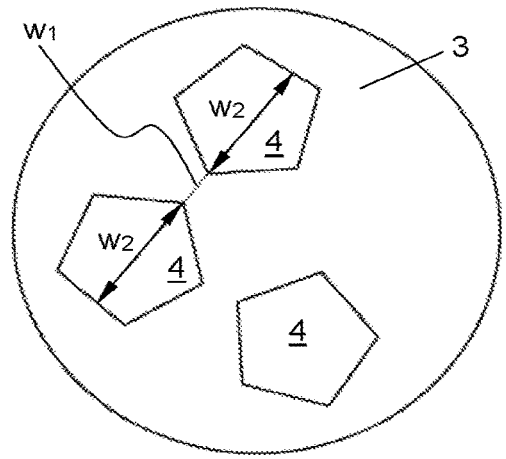
FIGS. 5a to 5c show further alternative holder designs according to embodiments of the invention.
Figure 5B:
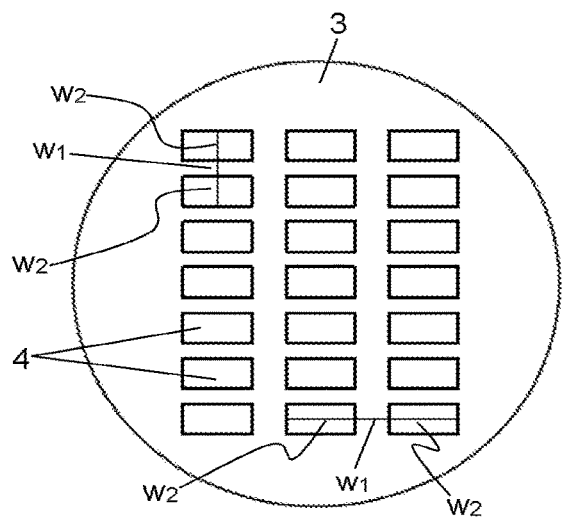
Figure 5C:
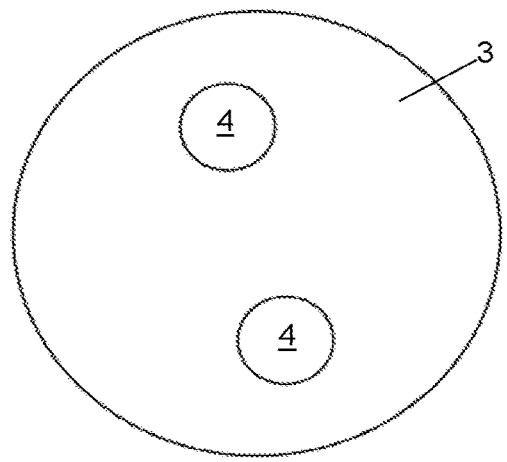

According to the embodiments described so far, at least one group of apertures 4 is distributed regularly at equal angular intervals around the centre 5 of the bottom portion 3, spanning 360°, while a central aperture 4' may or may not be added to the angularly spaced apertures. While this represents a preferred set of embodiments, the invention also includes embodiments wherein the apertures are randomly distributed, and randomly shaped, or arranged in a rectangular array instead of an angular array. Also in these embodiments, it is preferred that the strips of material between adjacent apertures is narrow, more preferably that least at one location, the smallest distance between two adjacent apertures 4 is smaller, preferably significantly smaller than the dimensions of the apertures as measured along the same direction as said smallest distance. FIGS. 5a and 5b illustrate a number of such alternatively arranged sets of apertures. However, the invention also covers embodiments wherein the characteristic of the narrow strips ($w_1 < w_2$) is not fulfilled, as in FIG. 5c for example. In this case, the holder still exhibits a number of the above-described advantages, such as the easier manufacturing and the advantages related to the use of a liquid electrolyte.

TECHNICALLY DETAILED EXAMPLES AND COMPARATIVE TESTS

Example 1

CR batteries were prepared with cathode composed of electrolytic manganese dioxide, graphite, carbon black, lithium hydroxide, PTFE, and other additives. After the cathode is thoroughly mixed, it was pressed into tablets. Two sets of tablets were prepared, one with meshes made in stainless steel, and the other with stainless steel holders as shown in FIG. 1. The thickness of the tablets were controlled to be within ±2% of each other.

These cathodes were then assembled into batteries using exactly the same assembly process. After cell assembly, these batteries were discharged using 3.32 kOhm resistors until a cutoff voltage of 2.0 V.

The batteries with stainless steel meshes released 245.7 mAh of capacity per gram of cathode active material, while the batteries built with holders produced 285.0 mAh of capacity per gram of cathode active material. The initial internal resistance, measured by a 1-second pulse through a resistor of 150 Ohm resistance, was 18.8 Ohms when a mesh is used and 10.1 Ohm when a holder was used.

Example 2

CR batteries were prepared with cathode composed of electrolytic manganese dioxide, graphite, carbon black, lithium hydroxide, PTFE, and other additives. After the cathode is thoroughly mixed, it was pressed into tablets. Two sets of tablets were prepared, one with meshes made in stainless steel, and the other with stainless steel holders as shown in FIG. 1. The weight of the tablets were controlled to be as close as possible. The difference among the weights of the tablets was controlled to be no more than ±2%.

These cathodes were then assembled into batteries using exactly the same assembly process. After cell assembly, these batteries were discharged using 3.32 kOhm resistors until a cutoff voltage of 2.0 V.

The batteries with stainless steel meshes released 256.4 mAh of capacity per gram of cathode active material, while the batteries built with holders produced 264.3 mAh of capacity per gram of cathode active material. The initial internal resistance, measured by a 1-second pulse through a resistor of 150 Ohm resistance, was 15.4 Ohms when a mesh is used and 13.3 Ohm when a holder was used.

From these examples, it is clear that using a holder according to the invention reduces the internal resistance of the battery. As a result, the active material can be discharged with higher efficiency, and achieves better utilization.

While the invention has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An electrically conductive holder for holding a tablet-shaped electrode of a button battery pressed into the holder, the holder comprising:
    a bottom portion; and
    a ring-shaped wall portion rising upward from an edge area of the bottom portion,
    wherein the bottom portion is flat and comprises multiple apertures,
    wherein a dimension of areas of solid material of the bottom portion situated in between two adjacent apertures, is smaller compared to dimensions of the two adjacent apertures,
    wherein each of the apertures in a depth direction of the apertures is devoid of the solid material over an entirety of the aperture,
    wherein the multiple apertures includes a group of apertures having a same shape and having a same first diameter, the group of apertures are distributed at regular angular intervals across an angle of 360° around a centre of the bottom portion, and
    wherein the multiple apertures includes a single aperture having a second diameter greater than the first diameter, the single aperture overlaps the centre of the bottom portion and has a same shape as the group of apertures.

2. The holder according to claim 1, wherein each area of the bottom portion situated between two adjacent apertures comprises at least one location or sub-area where the shortest distance between the two adjacent apertures is smaller than the width of each of the two adjacent apertures measured in the same direction as said smallest distance.

3. The holder according to claim 1, wherein at least a number of the apertures have a circular shape.

4. An assembly comprising:
    a holder according to claim 1; and an electrode tablet pressed into the holder.

5. A button battery comprising:
    a holder according to claim 1,
    wherein the holder includes a tablet-shaped cathode pressed into the holder, the battery includes a can, a lid, a separator sheet and an anode, and
    wherein the holder is placed with its bottom portion in physical contact with the bottom of the can, while the separator sheet and the anode are placed on top of the cathode.

6. The button battery according to claim 5, wherein said battery is a lithium ion battery.

* * * * *